US011473962B2

(12) United States Patent
Lustenberger et al.

(10) Patent No.: US 11,473,962 B2
(45) Date of Patent: Oct. 18, 2022

(54) METHOD AND DEVICE FOR DETECTING THE WEIGHT OF A LOAD MOVING ON SCALES

(71) Applicant: DIGI SENS Holding AG, Freiburg (CH)

(72) Inventors: Martin Lustenberger, Villars sur Glane (CH); Olivier Stuker, Aarburg (CH)

(73) Assignee: Digi Sens Holding AG, Freiburg (CH)

( * ) Notice: Subject to any disclaimer, the term of this patent is extended or adjusted under 35 U.S.C. 154(b) by 308 days.

(21) Appl. No.: 16/464,203

(22) PCT Filed: Nov. 24, 2017

(86) PCT No.: PCT/IB2017/057396
§ 371 (c)(1),
(2) Date: Aug. 2, 2019

(87) PCT Pub. No.: WO2018/100475
PCT Pub. Date: Jun. 7, 2018

(65) Prior Publication Data
US 2019/0391003 A1 Dec. 26, 2019

(30) Foreign Application Priority Data
Nov. 29, 2016 (CH) .................................. 01566/16

(51) Int. Cl.
G01G 19/02 (2006.01)
G01G 1/16 (2006.01)
(Continued)

(52) U.S. Cl.
CPC ............. *G01G 19/022* (2013.01); *G01G 3/16* (2013.01); *G01G 19/025* (2013.01); *G01G 19/035* (2013.01)

(58) Field of Classification Search
CPC ...... G01G 3/16; G01G 19/022; G01G 19/025; G01G 19/035
See application file for complete search history.

(56) References Cited

U.S. PATENT DOCUMENTS 3,446,299 A * 5/1969 Jan ....................... G01G 19/047
177/25.14
3,825,734 A * 7/1974 Jacobs .................. G01G 19/047
702/175
(Continued)

FOREIGN PATENT DOCUMENTS

CN 205593630 9/2016
JP S56-048521 5/1981
(Continued)

OTHER PUBLICATIONS

Katerbau, Ragnar, International Search Report for PCT/IB2017/057396, dated Dec. 6, 2018 [4 pages].

Primary Examiner — Natalie Huls
(74) Attorney, Agent, or Firm — Henry Patent Law Firm PLLC

(57) ABSTRACT

The invention relates to a method for calculating the weight of a load moving on scales (1). According to the method, a load signal of the scales is determined over a period of time using the speed of the load, and several partial load signals ($TL_1$, $TL_2$) are used, the total thereof providing the load signal, a first partial load signal ($TL_1$) displaying a maximum value as long as the load is fully on the weighing section of the scales (1), and a second partial load signal ($TL_2$) displaying a minimum value as long as the load is completely removed from the weighing section of the scales (1), and the speed of the movement of the load is determined from said partial load signals ($TL_1$ and $TL_2$). The invention also relates to scales for carrying out said method, comprising two weighing units (10, 11) with flexible deformation (Continued)

Figure 1:
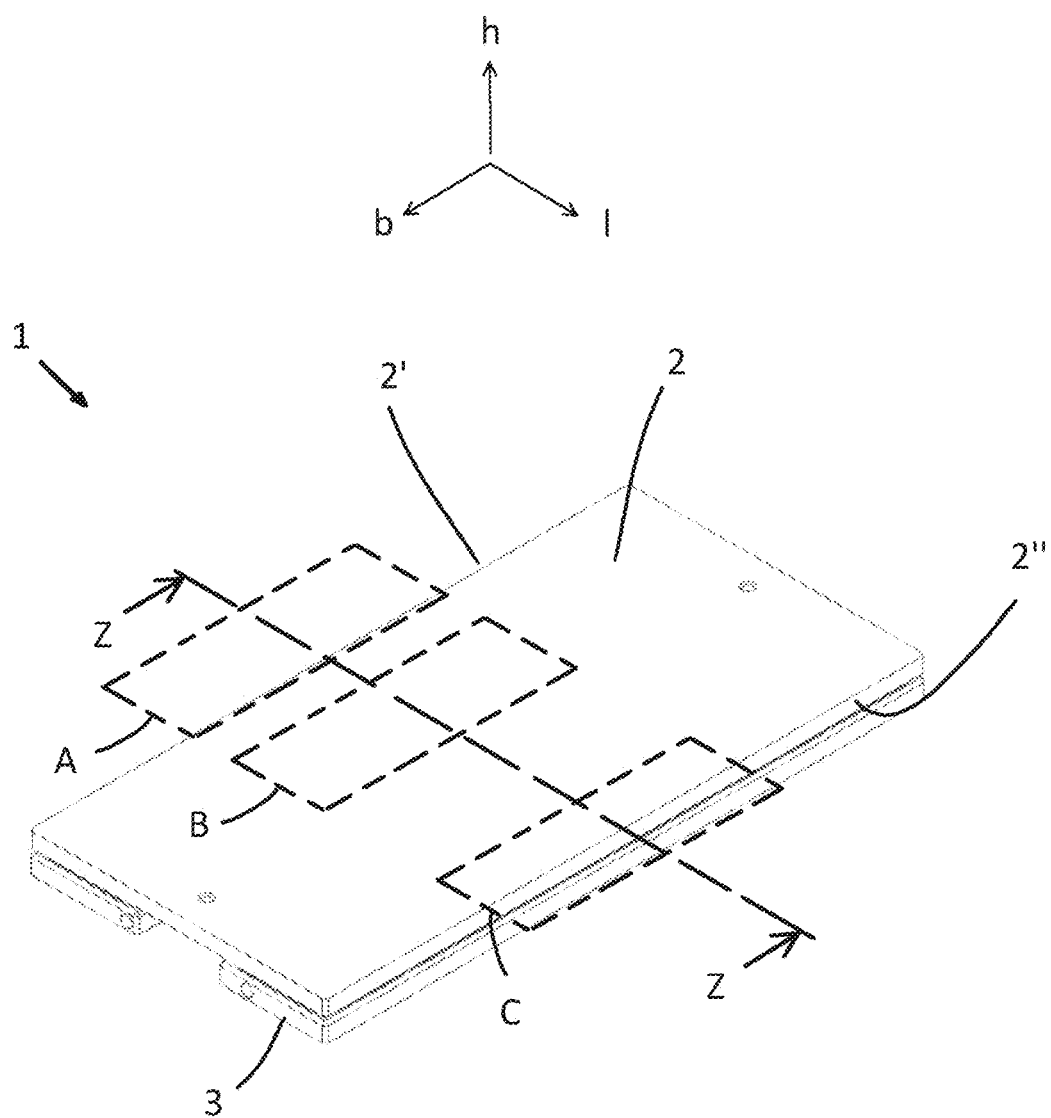

elements on which deformation sensors (7, 15), which generate the partial load signals ($TL_1, TL_2$), are arranged.

15 Claims, 5 Drawing Sheets

(51) Int. Cl.
 *G01G 19/03* (2006.01)
 *G01G 3/16* (2006.01)

(56) References Cited

U.S. PATENT DOCUMENTS

| | | | | |
|---|---|---|---|---|
| 3,835,945 | A * | 9/1974 | Yamanaka | G01G 19/024 177/134 |
| 4,049,069 | A * | 9/1977 | Tamamura | G01G 19/024 177/134 |
| 4,274,501 | A | 6/1981 | Gallo et al. | |
| 5,338,901 | A | 8/1994 | Dietrich | |
| 5,546,796 | A * | 8/1996 | Taniguchi | G01G 19/024 73/146 |
| 5,585,604 | A * | 12/1996 | Holm | G01G 19/035 177/133 |
| 5,998,741 | A * | 12/1999 | Beshears | G08G 1/015 177/133 |
| 6,137,066 | A * | 10/2000 | Wanelid | G01G 19/024 177/125 |
| 6,459,050 | B1 * | 10/2002 | Muhs | G01G 19/022 177/133 |
| 9,804,017 | B2 * | 10/2017 | Cornu | G01G 19/022 |
| 10,837,822 | B2 * | 11/2020 | Valdemarsson | G01G 19/02 |

FOREIGN PATENT DOCUMENTS

| | | |
|---|---|---|
| JP | S63-035923 | 3/1988 |
| JP | H06186241 | 7/1994 |
| JP | 2005127941 | 5/2005 |
| JP | 2010-091372 | 4/2010 |
| JP | 2013096857 | 5/2013 |
| WO | WO-01/22044 A1 | 3/2001 |
| WO | WO-2013/063710 A1 | 5/2013 |

\* cited by examiner

METHOD AND DEVICE FOR DETECTING THE WEIGHT OF A LOAD MOVING ON SCALES

The present invention relates to a method and a device.

Scales of the aforementioned type are used amongst other things in industry and also in traffic, there in order to detect the weight of motor vehicles during the passage, for example at pay stations or at controls. It is desirable to permit speeds as high as possible, for example above 50 km/h. Scales are known which, with a length in the region of a metre or more, detect the weight of a single wheel or, with a suitable width, the weight of an axle, wherein the weights of the wheels or the axles of a vehicle are then added up and the weight of the vehicle is thus obtained.

Apart from the large dimensions of such scales, the accuracy of the detected weight is also problematic, in particular when the vehicle is not standing on the scales, but is travelling over the latter. Even if the scales detect the weight to be measured by means of deformation sensors such as load cells, vibrations or movements of mechanics can scarcely be avoided, for example when the wheel runs onto the support plate of the scales or the tread blocks resulting from the tyre tread strike the carrier plate due to the rotation of the wheel. The load signal generated by the sensors of the scales is then superimposed with interferences, which considerably impairs the accuracy of measurement with increasing speed.

It is therefore known in the prior art to provide a support plate that is as long as possible, in order that the dwell time of the vehicle on the scales can be increased and the load signal can thus be lengthened and therefore averaged out, which improves the accuracy of the measurement. The averaging takes place for example by means of the algorithm $$\frac{\int_{t_1}^{t_2} f(t)dt}{v} = G$$

where f(t) denotes the load signal in the sense of the detected weight force, t the time and v the speed of the vehicle (or the load moving over the scales). The integration takes place as soon as the load signal has risen ($t_1$) and ends when the load signal falls again ($t_2$), wherein the quality of the averaging or the accuracy of the weight detection increases with the length of the duration of the load signal, so that as a rule very long scales are constructed in the travel direction.

A drawback with such scales is that the support plate has to be as long as possible in order to achieve an acceptable accuracy of the weight measurement, or conversely, that the speed permitted for the weighing is too low, so that a satisfactory solution (for example a permitted speed of 80 km/h with a length of the support plate of the scales of less than one metre) is not provided. In addition, such scales are expensive on account of the speed also having to be detected by a separate station, wherein the speed measurement must then take place axle by axle, in order that the correct speed is known for the respective weighing of an axle. Otherwise, the weight detection again loses considerably on accuracy, so that when for example a heavy goods vehicle is accelerated or decelerated in the region of the scales, its speed is however detected only once. The matching of the speed measurement to the moment at which each axle is located on the support plate is in turn costly.

Accordingly, the problem of the present invention is to produce an improved scale for the detection of the weight of a load moving over them.

This problem is solved by a method or by scales or by an arrangement.

Due to the fact that the load signal is detected in the form of partial load signals and the latter are processed, the speed of the load or the vehicle can be determined at the relevant moment, i.e. at the moment of the weight detection of the respective wheel or of the respective axle. In addition, the separate detection of partial load signals permits a much more accurate detection of the point in time at which the load begins to run onto the scales and/or has again completely left the latter, which improves the accuracy of the weighing and ultimately permits high speeds of the load.

Due to the fact that the scale comprises a plurality of weighing units, which are spanned by the support element, partial load signals can be generated which serve to detect the speed of the load moving over the scale and permit a calculation of the load with high accuracy at high speed.

Due to the fact that the scales can be grouped together, travel lanes for motor vehicles can be provided with an arrangement for measuring the weight of motor vehicles travelling over the arrangement, which permits the automatic detection of weight, speed and also travel direction of the motor vehicles.

Apart from the problem posed, compact scales in the region of 30 cm length, 60 cm width and 4 cm height can be produced according to the invention, which enable a measurement accuracy of <5% of the actual weight with a speed of 80 km/h and an axle load of more than 10 t.

Preferred embodiments comprise the features of the dependent claims.

The invention will be described below in somewhat greater detail with the aid of the figures.

Figure 2:
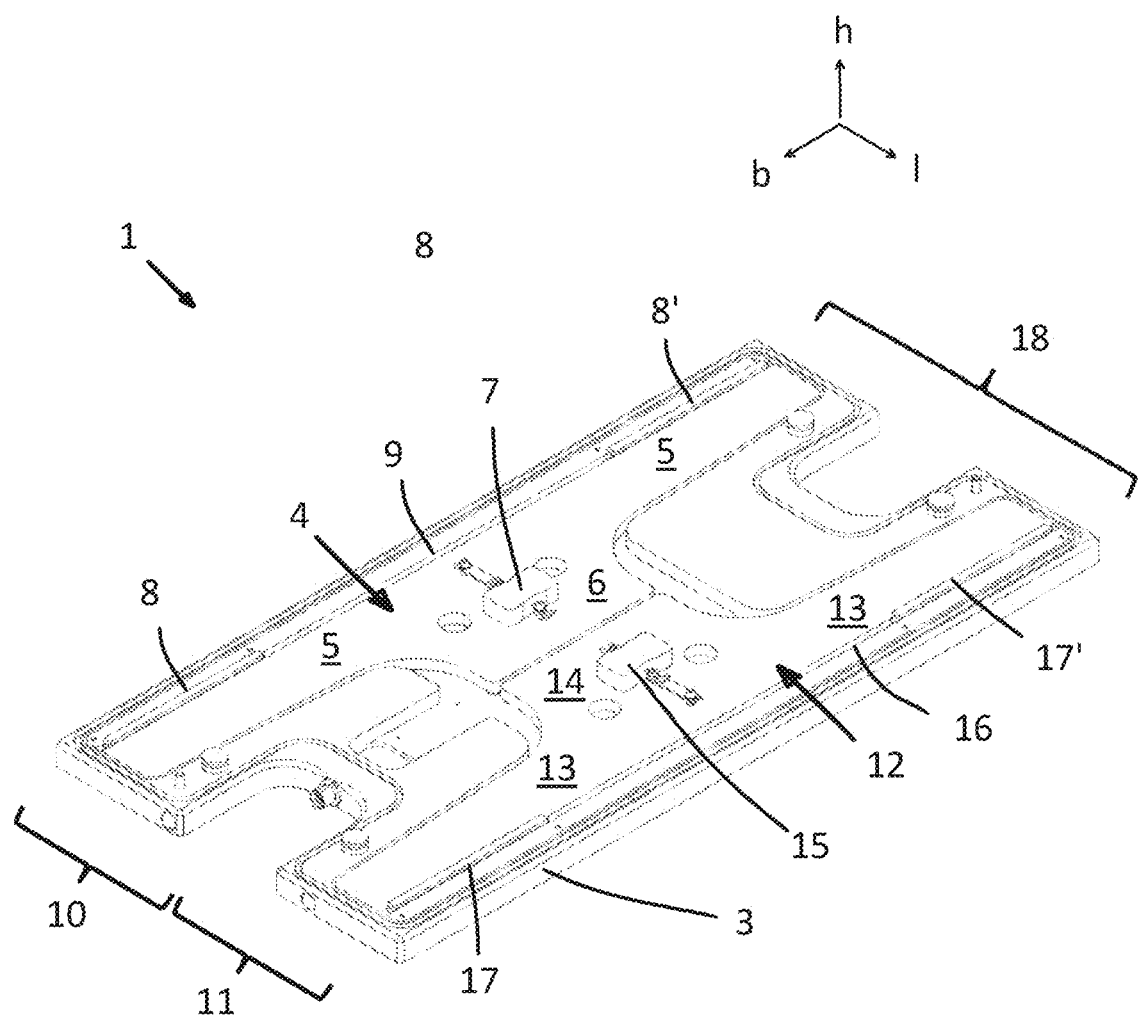
Figure 3:
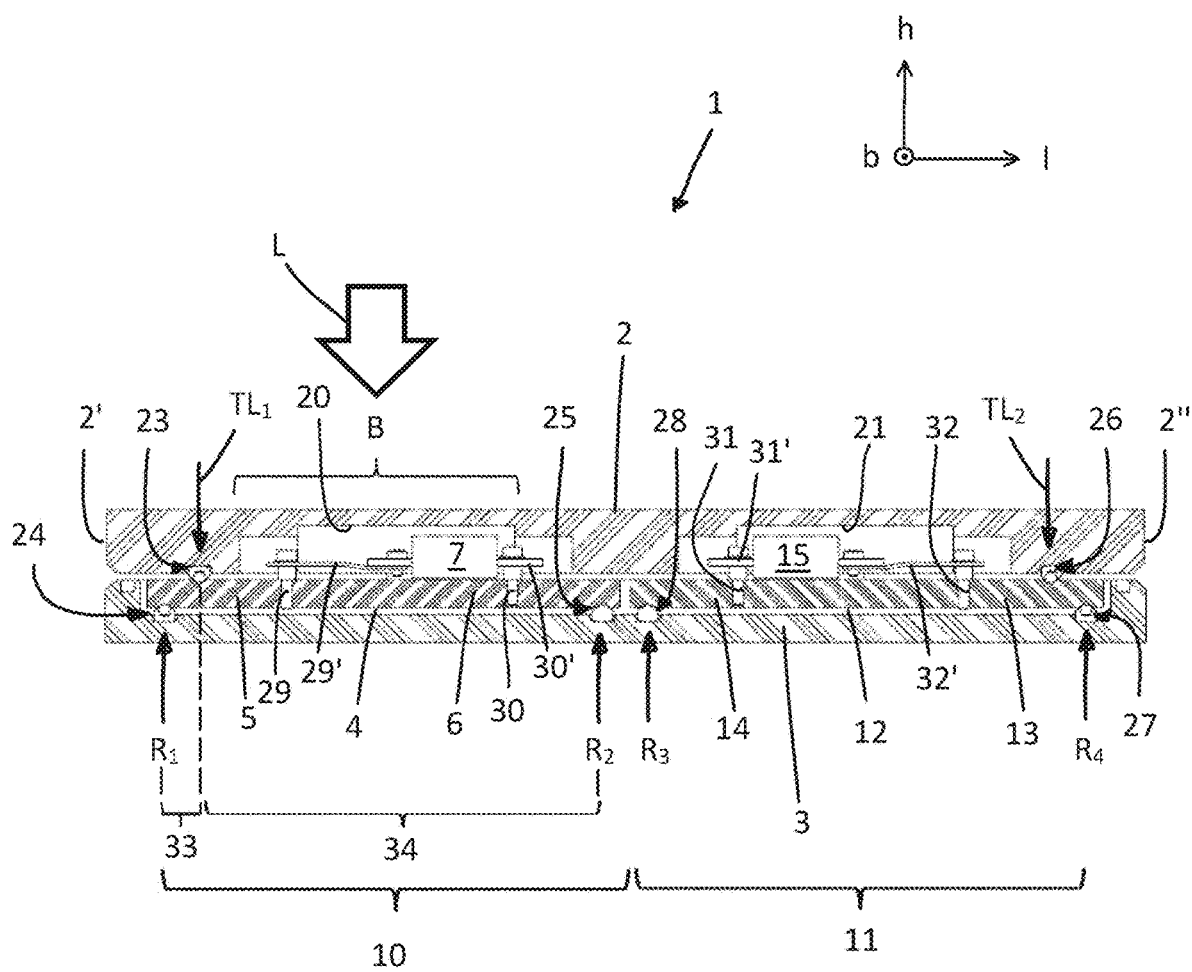
Figure 4A:
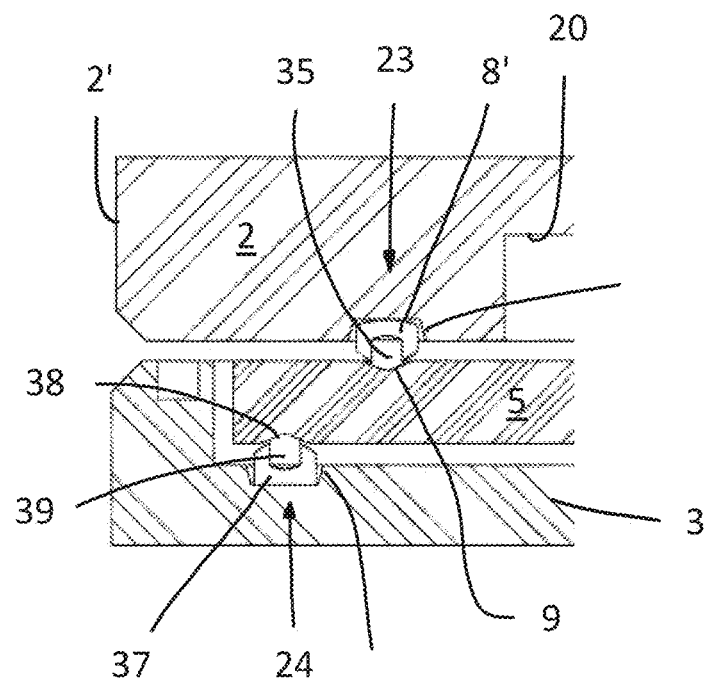
Figure 4B:
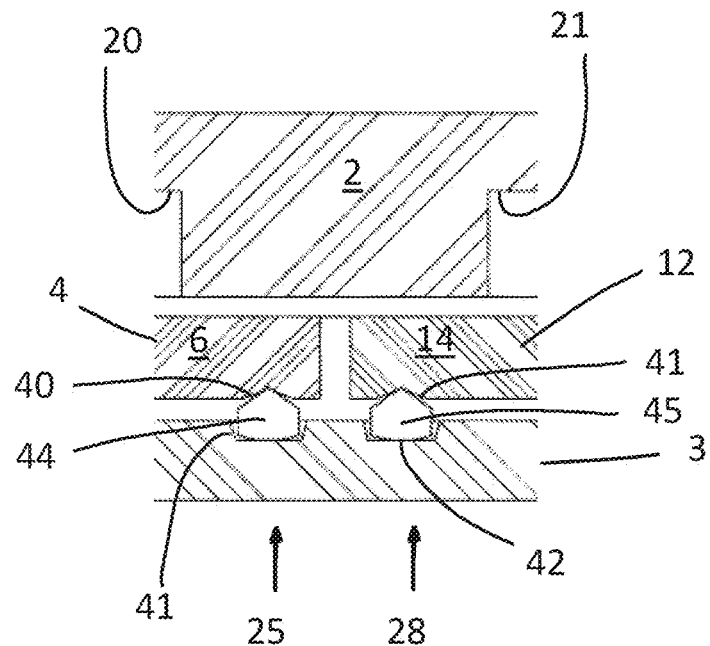
Figure 5:
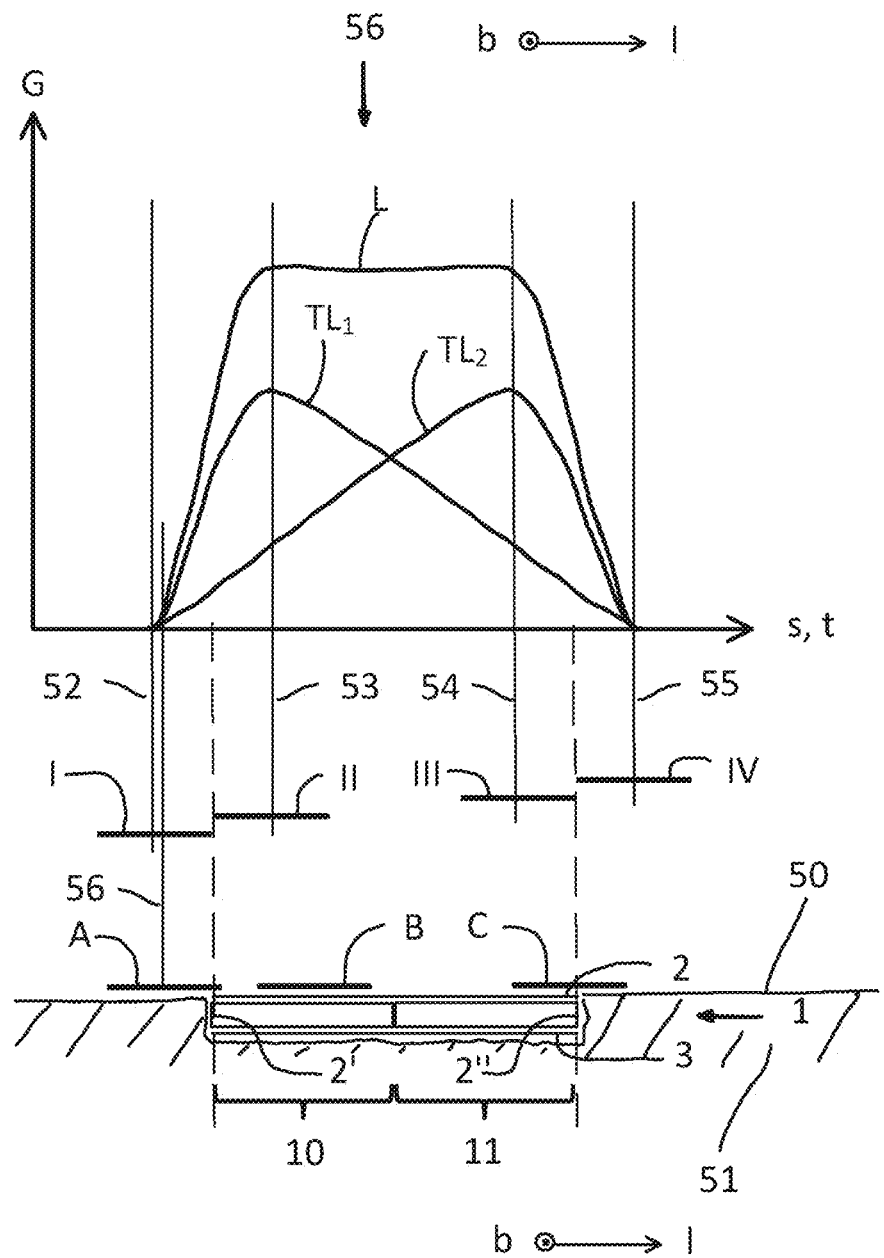

In the figures:

FIG. 1 shows a view of the scales according to the invention ready for installation, FIG. 2 shows a view of the scales from FIG. 1 with the support plate removed, FIG. 3 shows a cross-section through the scales from FIG. 1, FIG. 4a shows a detail from the cross-section through scales 1 according to FIG. 3, i.e. in the region of bearing points 23 and 24, FIG. 4b shows a detail from the cross-section through scales 1 according to FIG. 3, i.e. in the region of bearing points 25 and 28, and FIG. 5 shows a diagram with the load signals generated by the scales from FIG. 1, which scales are crossed over by a wheel.

FIG. 1 shows an embodiment of the scale 1 according to the invention with a support element constituted as a support plate 2 for receiving the load and a base plate 3, which can be embedded for example in the surfacing of a roadway or also in any other conveyor track for example in industry, in such a way that the surface of support plate 2 continues the roadway surface or the surface of the conveyor track, so that for example a vehicle travelling in the longitudinal direction (direction of length l) over the scales or a load moved over scales 1 is not hindered or disturbed by support plate 2. Viewed in the travel direction (direction of length l), support plate 2 has a front edge 2' and a rear edge 2".

Also sketched are contact areas A, B and C of a tyre rolling over support plate 2 of the scale 1 which are embedded here in a roadway surfacing. The tyre itself, for example the tyre of a heavy goods vehicle, is omitted in order not to encumber the figure and rolls in the direction of length l. Contact area A shows the moment at which the tyre is still located on the surrounding roadway surfacing, but is just beginning to run onto support plate 2, so that its front edge 2' is already loaded by the weight force of the tyre. Contact area B shows a moment at which the tyre is located completely (in a general position) on support plate 2, whilst contact area C shows a moment at which the tyre has partially run off support plate 2, is located over rear edge 2", i.e. is still partially lying on support plate 2 and already partially lying on the surrounding roadway surfacing and therefore support plate 2 is only partially loaded by the weight force.

In the embodiment shown in the figures, support plate 2 forms a measurement section of the scale 1.

The embodiment of the scale 1 represented in the figure has for example a length l of 30 cm, a width b of 60 cm and a height h of 4 cm, i.e. can be placed for example into pre-existing recesses in the roadway surfacing, such as are provided today for extremely simple scales for the mere detection of an axle passing by. Contact areas A, B and C can have a length of 10 cm and a width in the region of 30 cm. Again with regard to vehicles to be weighed, the weight transferred via contact areas A, B and C can be in the range from 100 kg (motorbike) up to several tonnes (heavy goods vehicle). It emerges that scales according to the invention preferably have a length of 50 cm or less and a width of 100 cm or less.

The support element or base plate 3 can of course be adapted to another use of scales 1.

FIG. 2 shows a view of the scale 1 from FIG. 1 with support plate 2 removed (FIG. 1), so that base plate 3 can be seen from inside with the elements arranged thereon. A bending deformation element constituted as a T-shaped bending beam 4 with a transverse beam 5 and a leg 6 can be seen. A deformation sensor 7 is arranged on the bending beam 4, preferably an oscillating wire sensor of the KL series, such as can be obtained from the applicant.

Support bars 8, 8' rest on transverse beam 5 in a first groove 9, on which support bars support plate 2 (FIG. 1), when mounted, in turn lies ready for operation. Transverse beam 5, for its part, is mounted on base plate 3—and therefore one the ground—by mean of the bearings shown in FIG. 3.

The arrangement with transverse beam 5, its bearing (FIG. 3), deformation sensor 7 and support bars 8, 8' forms a weighing unit 10.

A further weighing unit 11 is constituted in the same way as weighing unit 10 and correspondingly comprises a bending deformation element constituted as bending beam 12 with a transverse beam 13 and a leg 14, also a deformation sensor 15 and a first groove 16 and support bars 17, 17' arranged therein. This further, second weighing unit 11, according to the embodiment shown in FIG. 2, is located, when viewed in the travel direction (direction of length l), behind first weighing unit 10. When the support element is placed on, here when support plate 2 is placed on, the latter spans both weighing units 10 and 11 and acts with the one end, here front edge 2' (FIG. 1), on support bars 8, 8' and with the other end, here rear edge 2" (FIG. 1), on the respective support bars 17, 17' and therefore on bending beams 4 and respectively 11.

The two weighing units 10, 11 form a weighing arrangement 18 of scales 1 which is arranged on the base plate. Cables for transmitting the load signals of the deformation sensors and also plugs for the external transmission of the data can be provided in further recesses represented in FIG. 2. A computer for evaluating the load signals can be provided on base plate 3 or externally, the design in this regard being able to be undertaken by the expert in the specific case.

To sum up, according to the embodiment shown in FIG. 2, a scale 1 is provided for calculating the weight of a load moving over it with a support element and a weighing arrangement 18, wherein weighing arrangement 18 comprises a plurality of weighing units 10, 11 and each weighing unit 10, 11 comprises a bending deformation element with a deformation sensor 7, 15 generating a load signal, and wherein weighing units 10, 11 are arranged one after the other in the direction of movement of the load (direction 1), the support element spans the latter and, in order to transfer the weight force, acts with its one end (here front edge 2') on the deformation element of the first weighing unit and with its other end (here rear edge 2") on the deformation element of a second weighing unit 11.

FIG. 3 shows a cross-section through the scale 1 according to the invention in the view ZZ of FIG. 1. Support plate 2, base plate 3 and the two weighing units 10, 11 with their bending beams 4, 12 can be seen.

Deformation sensors 7, 15 of weighing units 10, 11 are each arranged in a recess 20, 21 of support plate 2 assigned respectively to them. Support plate 2 itself is made solid, is bent very little itself and is scarcely weakened by comparatively small recesses 20, 21. Base plate 3 is laid on the ground.

Each weighing unit 10, 11 comprises three bearing points 23 to 25 and 26 to 28, wherein bearing points 23 and 26 serve to transfer the weight force of the load (here: of the tyre) L from support plate 2 to bending beams 4, 12 and bearing points 24, 25 and 27, 28 serve to support bending beams 4, 12 loaded by the weight force on base plate 3 and therefore on the ground. In other words, a partial load $TL_1$ and respectively $TL_2$ acts in each case on assigned bending beams 4 and 12 (partial loads $TL_1$ and $TL_2$ of course result in total in load L). Reaction forces $R_1$ to $R_4$ of base plate 3 also act on assigned bending beams 4 and 12 respectively.

Since bearing points 23, 26, viewed in the horizontal, are located between bearing points 24, 25 and 27, 28, bending beams 4, 12 bend downwards (towards base plate 3) when support plate 2 is loaded, bolts 29, 30 and 31, 32 tilt towards one another with their upper end, so that deformation sensors 7, 15 are put under pressure via levers 29', 30' and 31', 32' and each generate a deformation signal $D_1$ and $D_2$, which in turn corresponds to partial load $TL_1$ and $TL_2$ acting on respective bending beam 4, 12.

Bearing points 23 to 28 are represented in greater detail in FIGS. 4a to 4c.

As mentioned, bearing point 23 is located between bearing points 24 and 25 in weighing unit 10, which leads to the defined bending of bending beam 4: in the present case, i.e. with the embodiment of the invention selected and represented here, horizontal distance 33 between bearing points 23 and 24 amounts to approx. 10 mm, distance 34 between bearing points 23 and 25 to approx. 120 mm, so that, with regard to the bending of bending beam 4, a translation ratio of approx. 1:12 results in respect of acting partial load $TL_1$: the bending is slight, the scales hard and therefore suitable for loads in the region of several tonnes. If the location of bearing point 23 is shifted more towards that of bearing point 25, the bending increases with the same partial load $TL_1$, the scale becomes softer, it is suitable for smaller loads with higher accuracy even with low sensitivity or simple deformation sensors. For the specific case, the expert can establish the design of the bending deformation element (here bending beams 4), the location of the bearing points (here bearing points 23 to 25) and the design of the deformation sensor (here the oscillating wire sensor 7). Particularly in the area of the deformation sensors, strain gauges etc. also come into consideration, depending on the desired resolution in the detection of the bending of the bending deformation element. The same also applies to weighing unit 11.

To sum up, it emerges that the bending deformation element preferably has a T-shaped outline (FIG. 2) and the action of the weight force takes place linearly over a length of the transverse beam (FIG. 2, support bars 8, 8' and 17, 17') and the deformation sensor 7, 15 detects bending of deformation element 4, 12 in the region of its leg 6, 14. The bending deformation element can also have another suitable outline which, in combination with a deformation sensor, leads to a suitable deformation of the latter in the event of a load.

It also emerges that the support element is preferably constituted as a support plate 2 and the bending deformation element of a weighing unit 10, 11 runs essentially parallel to support plate 2, and is laid on the ground at its ends lying opposite in the direction of the movement of the load (direction of length 1), and wherein the action of the weight force (here partial load $TL_1$ and $TL_2$) takes place between bearings (here between bearing points 24, 25 and 27, 28), preferably adjacent to one of the bearings, in such a way that the deformation element bends under the effect of weight force.

The first and second weighing unit 10, 11 are preferably arranged in such a way that the deformation elements are adjacent to one another. In particular, according to the embodiment shown, the two weighing units 10, 11 are constituted the same, wherein legs 6, 14 of the two T-shaped bending beams 4, 12 are directed towards one another, or in other words, the introduction of force of the support plate preferably takes place in the region of the ends of the two weighing units 10, 11 that face away from one another.

FIG. 4a shows a detail from the cross-section through the scale 1 according to FIG. 3, i.e. in the region of edge 2' with bearing points 23 and 24.

Bearing point 23 comprises first groove 9 (FIG. 2) in bending beam 4, a groove 35 in support plate 2 and support bars 8' lying in the two grooves. A limiting element 36 prevents support bar 8' from being displaced in the groove, here at right angles to the plane of FIG. 4a. The upper side of support bar 8' lying in the groove 35 is formed spherical, i.e. convex, so that a slight horizontal transverse displacement between support plate 2 and bending beam 4 can take place, see in this regard the description below. Bearing point 23 is constituted as a pendulum bearing.

Bearing point 24 comprises a groove 37 in base element 3, a second groove 38 in bending beam 4 and a support bar 39, which lies in the two grooves 37, 38, wherein both its underside and also its upper side are constituted diametrically opposed to groove 37 and 38. A horizontal transverse displacement between base plate 3 and bending beam 4 is prevented—bearing point 24 is constituted as a fixed bearing. Support bar 39 can be continuous over the entire width of transverse beam 5 (FIG. 2) or divided, as is the case with support bar 8'. Limiting element 36 is then in turn provided, which fixes support bar 39 in groove 38.

Bearing points 26, 27 in the region of edge 2" are constituted in the same way as bearing points 23 and 24.

FIG. 4b shows a detail from the cross-section through scales 1 according to FIG. 3, i.e. in the region of bearing points 25 and 28. In a third groove 40 in deformation beam 4 and a third groove 41 in bending beam 12, on the one hand, and in grooves 41, 42 in base plate 3 on the other hand, further support bars 44, 45 are inserted and constituted such that a pendulum bearing (self aligning bearing) is present as in bearing points 23, 26.

The arrangement shown in FIGS. 4a and 4b enables the load measurement according to the invention by means of deformation sensors 7, 15 without or practically without hysteresis. If the bending beam for example is bent downwards due to the partial load, the distance from bearing point 24 to bearing point 23 and in particular to bearing point 25 becomes somewhat shorter, which in the case of only fixed bearings would lead to distortions in the bending beam, which influence the measurement result and lead to a hysteresis. It is true that bending beam 4, is constituted solid and the displacements occurring during the bending are small. With the necessary and also possible sensitivity of oscillating wire sensors preferably used as deformation sensors 7, 15, a bearing without a pendulum bearing would however lead to erroneous measurement results.

It emerges according to the invention, and preferably so, that the deformation element is supported on the ground (here via base plate 3) by means of a fixed bearing 24, 27 in the region of the action of the weight force and by means of a movable bearing (floating bearing) 25, 28 at its opposite end, and wherein the action of the weight force on the deformation element takes place via a pendulum bearing 23, 26.

FIG. 5 shows in the lower part a roadway surface 50 in cross-section, with scales 1 in the embodiment according to FIGS. 2 to 4b represented symbolically in the form of a line drawing with the aid of weighing units 10, 11 and support plate 2 and base plate 3, said scales being embedded in the roadway surfacing and thus lying on ground 51. The location of tyre contact areas A, B and C according to FIG. 1 is represented.

For the sake of greater clarity, tyre contact areas I to IV of a vehicle travelling over scales 1 are represented farther above, which each have a special location, i.e.

tyre contact area I which, viewed in the travel direction (direction of length 1), is located immediately before front edge 2' of support plate 2, then tyre contact area II, which is located immediately after front edge 2', so that the tyre is located completely on support plate 2, finally, tyre contact area III, precisely before rear edge 2", at a moment when the tyre is just still completely on support plate 2, and ultimately tyre contact area IV, wherein the tyre has just completely left support plate 2.

The respective location of the axle of the wheel belonging to the tyre is assigned to these tyre contact areas I to IV, said location naturally lying in the middle of the tyre contact area, see vertical lines 52 to 55.

Lines 52 to 55 run upwards, into a diagram 56, which in the horizontal axis shows section s in the travel direction, and assuming constant speed of the vehicle to be measured, also time t. The purely qualitative amount G of the load signals is plotted on the vertical axis, i.e. the curve of partial load signal $TL_1$ of weighing unit 10 (signal of deformation sensor 7), the curve of partial load signal $TL_2$ of weighing unit 11 (signal of deformation sensor 15), and the curve of load signal L as the sum of partial load signals $TL_1$ and $TL_2$.

It follows from the structure of the scale 1 that partial load signals $TL_1$ and $TL_2$ each assume different values when a load rolls over scales 1, except when the load is standing precisely in the middle of support element or support plate 2.

It also follows that partial load signal $TL_1$ of weighing unit 10 is minimal, i.e. zero, when the tyre has not yet reached support plate 2, see tyre contact area I and line 52. Partial load signal $TL_1$ reaches a maximum as soon as the tyre stands completely on support plate 2, see tyre contact area II and line 53. The partial load signal then falls continuously down to zero as soon as the tyre has completely left scales 1, see tyre contact area IV.

Similarly for partial load signal $TL_2$, which begins to rise as soon as the front end of the tyre contact area has reached scales 1, see for example tyre contact area A with line 56, which after a continuous rise reaches a maximum as soon as the tyre contact area is located precisely in front of rear edge 2" of support plate 2, see tyre contact area III, and falls to zero as soon as the tyre has completely left scales 1, see tyre contact area IV.

The diagram shows that partial load signal $TL_1$ rises sharply while the wheel is running onto scales 1, and then falls in a shallow manner until the tyre has completely run off the latter, conversely partial load signal $TL_2$ rises in a shallow manner while the wheel is running onto the scales and crosses the latter, and then falls sharply as soon as the wheel is located only partially on scales 1.

The diagram shows only to some extent the aforementioned disruption of load signals $TL_1$, $TL_2$ by the dynamics of a tyre travelling over support plate 2, which makes the evaluation very difficult, because for example, due to such disturbances, the rise of a partial load signal $TL_1$ and $TL_2$ from zero cannot be precisely determined reliably in terms of time, likewise the transition of the rising flank of the sum—load signal L—into the horizontal region, as long as the tyre is located completely on scales 1.

According to the invention, the speed of the tyre, the weight and the length of the tyre contact area can be calculated as follows:

The tyre has covered the length of the scales when, proceeding from position II of the tyre contact area, it has reached position IV of the tyre contact area. These positions can be determined comparatively well, since on the one hand partial load signal $TL_1$ has a maximum in position II, which by means of mathematical algorithms can be detected much more sharply than the mere transition from the rise onto a horizontal branch (load signal L) and on the other hand partial signal $TL_2$ falls sharply to zero in position IV, so that the time at which the zero value is reached can be calculated much more precisely than over partial signal $TL_1$ falling in a shallow manner.

According to the invention, and preferably, the speed of the tyre thus results from the division of the length of scales 1 by the time between the maximum of partial load signal $TL_1$ and the reaching of the zero value of partial load signal $TL_2$. Equally, the speed can conversely also be calculated over the time between the (steeper) rise of partial load signal $TL_1$ and the maximum of partial load signal $TL_2$.

A method according to the invention emerges, according to which the speed is preferably determined from the time difference between the maximum of first $TL_1$ and the subsequent minimum of second partial load signal $TL_2$, or the first minimum of first $TL_1$ and the subsequent maximum of second partial load signal $TL_2$, in connection with length l of the associated measurement sections.

Once the speed is determined, the way is opened up for the calculation of the load, whereby partial load signals $TL_1$ and $TL_2$ are first added up and then averaged, for example as mentioned above by $$\frac{\int_{t_1}^{t_2} f(t)dt}{v} = G_{load}$$

wherein limits $t_1$ and $t_2$ still have to be established. According to the invention, the sharply definable maxima of partial load curves $TL_1$ and $TL_2$ are suitable here.

Partial load curves $TL_1$ and $TL_2$ are preferably used for $t_1$ and $t_2$, however the start of the steep rise of partial load signal $TL_1$ (line 52) for $t_1$ and the end of the steep fall of partial load signal $TL_2$ (line 55) for $t_2$. This has the advantage that load signal L can be averaged over a longer time, for example double the time, than is available between the maxima of partial load curves $TL_1$ and $TL_2$: If for example, as above, a length of scales 1 of 30 cm and a length of tyre contact area A to C and I to IV of 10 cm is assumed, the length between the maxima amounts to 20 cm (the lines 53 and 54), the length between the start zero value of partial load signal $TL_1$, i.e. its first minimum, and the (steep) fall to the second, end zero value, i.e. of the second minimum of partial load signal $TL_2$, amounts to 40 cm (lines 52 and 55).

It should be noted at this point that the travel direction can be determined for example from the temporal sequence of the maxima of the partial load curves, which is sensible in the case of direction-bound measurement sections, in order to determine a load moving against the prescribed direction, as this can be crucial at pay stations for motorways or other facilities.

It preferably emerges that the averaging of load signal L over time t takes place by integration of signal L over time t and division by the speed of movement of the load. A method also particularly preferably emerges, wherein the averaging of the load signal already starts with the incipient rise (line 52) of first partial load signal $TL_1$ and preferably does not end until the zero value (line 55) of last partial load signal $TL_2$ is reached. Finally, according to the invention, it is also the case that preferably two partial load signals totaled together produce the load signal, and wherein the first and the second partial load signal begin and end at the same time interval limits in each case and have their maxima in the interval.

To sum up, according to the invention, a method is provided for calculating the weight of a load moving over scales, wherein a load signal of the scales is averaged over a period of time with the aid of the speed of the load, and wherein a plurality of partial load signals are used which in total produce the load signal, wherein a first partial load signal indicates by a maximum as soon as the load is located completely on a measurement section of the scales and a second partial load signal indicates by a minimum value as soon as the load has completely run off from another measurement section of the scales, and that the speed of movement of the load is determined from these partial load signals.

The length of the contact area can be determined for example from the time between the maximum of second partial load curve $TL_2$ and its subsequent zero value multiplied by the determined speed, or conversely and analogously, from the time for the rise of the steep flank of partial load signal $TL_1$.

According to the invention, a method emerges, wherein the length of the contact area of the load on a support element of the scales is determined by the time within which a partial load signal displays the minimum value, because the load has just reached or left the scales, and the maximum of the partial load signal, where the load is only just completely located on the scales or is just still completely on the scales, in relation to the total time in which this partial load signal generates load values for this load. The length of the contact area can for example be an indicator of deficient (or excessively high) air pressure in the tyre or serve other purposes.

An arrangement of scales, wherein their support elements are constituted as support plates and a plurality of scales in a traffic lane, with the support plates lying side-by-side next to one another, are arranged at right angles to said traffic lane and a central computing unit evaluates the partial load signals of the deformation sensors of the individual scales and determines retrievably at least one of the values for the speed, the weight or the travel direction of an axle rolling over the scales at an interface of the computing unit.

The invention claimed is:

1. A method for calculating the weight of a load moving at a speed over a measurement section of a scale with a speed, wherein a load signal of the scale being indicative of the weight of the load resting on the scale while the load is moving over the scale is averaged by an algorithm over a period of time, the algorithm including the speed of the load, wherein a plurality of partial load signals of the scale are used, the sum of which being equal to the load signal, wherein a first partial load signal indicates by a maximum value as soon as the moving load is located completely on the measurement section of the scale and a second partial load signal indicates by a minimum value as soon as the moving load has completely run off from the measurement section of the scale, or a first partial load signal indicates by a first minimum value as soon as the moving load has reached the measurement section and a second partial load signal indicates by a maximum value as soon as the moving load starts to run off the measurement section and that the speed of movement of the load is determined from these partial load signals.

2. The method according to claim 1, wherein the averaging of the load signal over time takes place by integration of the signal over time and division by the speed of movement of the load.

3. The method according to claim 1, wherein the averaging of the load signal already starts with the incipient rise of the first partial load signal and does not end until the zero value of the last partial load signal is reached.

4. The method according to claim 1, wherein the speed is determined from the time difference between the maximum of the first and the subsequent minimum of the second partial load signal, or the first minimum of the first and the subsequent maximum of the second partial load signal, in connection with a length of the associated measurement sections.

5. The method according to claim 1, wherein a length of the contact area of the load on a support element of the scale is determined by the time within which a partial load signal displays the minimum value, because the load has just reached or left the scale, and the maximum of the partial load signal, where the load is only just completely located on the scale or is just still completely on the scale, in relation to the total time in which this partial load signal generates load values for this load.

6. The method according to claim 1, wherein two partial load signals in total produce the load signal, and wherein the first and the second partial load signal begin and end at the same time interval limits in each case and have their maxima in the interval.

7. A scale for calculating the weight of a load moving over scale according to the method of claim 1 with a support element and a weighing arrangement, wherein the weighing arrangement comprises a plurality of weighing units and each weighing unit comprises a bending deformation element with a deformation sensor generating a load signal, wherein the weighing units are arranged one after the other in the direction of movement of the load, the support element spans the latter and, in order to transfer the weight force, acts with its one end on the deformation element of the first weighing unit and with its other end on the deformation element of a second weighing unit, wherein the support element is constituted as a support plate and the bending deformation element of a weighing unit runs essentially parallel to support plate, and is laid on the ground at its ends lying opposite in the direction of movement of the load, and wherein the action of the weight force takes place between bearings, preferably adjacent to one of the bearings, in such a way that the bending deformation element bends under the effect of weight force, and wherein the support plate comprises, at a first end, a first bearing directly on a bending deformation element of a first weighing unit of the plurality of weighing units and, at a second end, a second bearing directly on a bending deformation element of a second weighing unit.

8. The scale according to claim 7, wherein the bending deformation element has a T-shaped outline and the action of the weight force takes place linearly over a length of a transverse beam and the deformation sensor detects bending of deformation element in the region of a leg.

9. The scale according to claim 7, wherein the deformation element is supported on the ground by means of a fixed bearing at the location of the action of the weight force and by means of a movable bearing at its opposite end, and wherein the action of the weight force on the deformation element takes place via a pendulum bearing.

10. The scale according to claim 7, wherein the first and the second weighing unit are arranged in such a way that their deformation elements are adjacent to one another.

11. The scale according to claim 8, wherein the weighing units are constituted the same and their legs are directed towards one another.

12. The scale according to claim 7, wherein the deformation sensors of the weighing units are constituted as oscillating wire sensors.

13. The scale according to claim 7, wherein its length in the direction of movement of the load amounts to less than 50 cm, preferably 30 cm.

14. The scale according to claim 7, wherein its width amounts to less than 100 cm, preferably 60 cm.

15. An arrangement of scales according to claim 7, wherein their support elements are constituted as support plates and a plurality of scales in a traffic lane, with the support plates lying side-by-side next to one another, are arranged at right angles to said traffic lane and a central computing unit evaluates the partial load signals of the deformation sensors of the individual scales and determines retrievably at least one of the values for the speed, the weight or the travel direction of an axle rolling over the scales at an interface of the computing unit.

* * * * *